(12) United States Patent
Hackett et al.

(10) Patent No.: US 10,109,382 B2
(45) Date of Patent: Oct. 23, 2018

(54) STEEL-VANADIUM ALLOY CLADDING FOR FUEL ELEMENT

(71) Applicant: TerraPower, LLC, Bellevue, WA (US)

(72) Inventors: Micah J. Hackett, Seattle, WA (US); Greg A. Vetterick, Seattle, WA (US); Cheng Xu, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 0 days.

(21) Appl. No.: 15/623,119

(22) Filed: Jun. 14, 2017

(65) Prior Publication Data

US 2018/0233241 A1  Aug. 16, 2018

Related U.S. Application Data

(60) Provisional application No. 62/458,377, filed on Feb. 13, 2017.

(51) Int. Cl.
| | |
|---|---|
| *G21F 1/08* | (2006.01) |
| *C22C 27/02* | (2006.01) |
| *C22C 38/32* | (2006.01) |
| *C22C 38/28* | (2006.01) |
| *C22C 38/26* | (2006.01) |
| *C22C 38/22* | (2006.01) |
| *C22C 38/02* | (2006.01) |

(Continued)

(52) U.S. Cl.
CPC ............... *G21F 1/085* (2013.01); *B32B 1/02* (2013.01); *B32B 15/015* (2013.01); *C22C 27/025* (2013.01); *C22C 38/001* (2013.01); *C22C 38/002* (2013.01); *C22C 38/02* (2013.01); *C22C 38/22* (2013.01); *C22C 38/26* (2013.01); *C22C 38/28* (2013.01); *C22C 38/32* (2013.01); *G21F 5/015* (2013.01); *B32B 2439/00* (2013.01)

(58) Field of Classification Search
CPC ..... G21F 1/085; G21F 5/015; B32B 2439/00; B32B 1/02; C22C 38/001; C22C 38/002; C22C 38/02; C22C 38/22; C22C 38/26; C22C 38/28; C22C 38/32; C22C 27/025
See application file for complete search history.

(56) References Cited

U.S. PATENT DOCUMENTS 3,597,193 A    8/1971  Pollack et al.
3,850,584 A *  11/1974 Bohm ................... C22C 27/025
                                                    376/416

(Continued)

FOREIGN PATENT DOCUMENTS

GB    1396455 A       6/1975
KR    101483873 B1    1/2015

OTHER PUBLICATIONS

Chung et al., Properties of V-4Cr-4Ti for Application as Fusion Reactor Structural Components, Third International Symposium on Fusion Nuclear Technology, 1994.*

(Continued)

*Primary Examiner* — David E Smith

(57) ABSTRACT

This disclosure describes various configurations and components for bimetallic and trimetallic claddings for use as a wall element separating nuclear material from an external environment. The cladding materials are suitable for use as cladding for nuclear fuel elements, particularly for fuel elements that will be exposed to sodium or other coolants or environments with a propensity to react with the nuclear fuel.

22 Claims, 12 Drawing Sheets

(51) Int. Cl.
  *C22C 38/00* (2006.01)
  *B32B 15/01* (2006.01)
  *B32B 1/02* (2006.01)
  *G21F 5/015* (2006.01)

(56) References Cited

U.S. PATENT DOCUMENTS

| | | | |
|---|---|---|---|
| 3,925,151 A | 12/1975 | Klepfer | |
| 4,029,545 A | 6/1977 | Gordon et al. | |
| 4,032,400 A * | 6/1977 | Johnson | G21C 3/17 |
| | | | 252/181.6 |
| 4,045,288 A | 8/1977 | Armijo | |
| 4,242,130 A | 12/1980 | Brandis et al. | |
| 4,390,497 A | 6/1983 | Rosenbaum et al. | |
| 4,894,203 A * | 1/1990 | Adamson | C22C 16/00 |
| | | | 376/414 |
| 4,977,034 A | 12/1990 | Wang | |
| 5,247,550 A | 8/1993 | Perkins | |
| 5,301,218 A | 4/1994 | Taylor | |
| 5,524,032 A * | 6/1996 | Adamson | G21C 3/06 |
| | | | 376/409 |
| 2008/0240334 A1* | 10/2008 | Senor | G21C 3/02 |
| | | | 376/416 |
| 2011/0171463 A1 | 7/2011 | Hohle et al. | |
| 2013/0170603 A1* | 7/2013 | Baek | G21C 3/16 |
| | | | 376/416 |
| 2014/0185733 A1* | 7/2014 | Povirk | G21C 3/07 |
| | | | 376/417 |

OTHER PUBLICATIONS

Bragg-Sitton, Shannon, Development of advanced accidnet-tolerant fuels for commercial LWRs, Nuclear News, Mar. 2014, pp. 83-91.
Cohen, et al., ANL/ET/CP80384, Vanadium Line HT9 Cladding Tubes, 1994.
Kim, et al., Performance of a diffusion barrier under a fuel-clad chemical interaction (FCCI), J. Nucl. Mater., 394 (2009) 144-150.
Edison et al., "Vanadium Alloys vs Stainless Steel for Sodium-Cooled Fast Reactor Cladding", Nuclear Applications & Technology vol. 7, Nov. 1969, pp. 443-455.
Shantong et al, "Mechanical Properties of Vanadium Carbide Layer on Steel Surface", International Conference on Mining, Mineral Processing and Metalleruglcal Engineering, Apr. 15-16, 2013, pp. 141-144.
Borisova et al., "Vanadium Carbide Coatings: Deposition Process and Properties", Plansee Holding AG, Jan. 1, 2001.
Heo, ("Recrystallization and Precipitation Behavior of Low-Activation V—Cr—Ti Alloys After Cold Rolling", Journal of Nuclear Materials, vol. 325, Issue 1, 2004, p. 53-60.
Klepikov, "Hydrogen Release from Irradiated Vanadium Alloy V—4Cr—4Ti", Fusion Engineering and Design, vol. 51-52, 2000, p. 127-133.
Starlite, Appendix to "The Starlite Study: Assessment of Options for Tokamak Power Plants", 1997, http://aries.ucsd.edu/Li 8/ RE PORT /ST AR LITE/FI NAL/appendix.pdf.

* cited by examiner

STEEL-VANADIUM ALLOY CLADDING FOR FUEL ELEMENT

CROSS REFERENCE TO RELATED APPLICATIONS

The present application claims the benefit of U.S. Provisional Patent Application No. 62/458,377, titled "STEEL-VANADIUM ALLOY CLADDING FOR FUEL ELEMENT", filed Feb. 13, 2017.

INTRODUCTION

When used in nuclear reactors, nuclear fuel is typically provided with cladding. The cladding may be provided to contain the fuel and/or to prevent the fuel from interacting with an external environment. For example, some nuclear fuels are chemically reactive with coolants or other materials that may otherwise come in contact with the nuclear fuel absent the cladding to act as a separator.

The cladding may or may not be a structural element. For example, in some cases the nuclear fuel is a solid structural element, e.g., a solid rod of uranium metal or uranium dioxide, and the cladding is essentially a coating applied to the surface of the solid fuel. In other cases, nuclear fuel may be in a liquid form, powder form, or aggregate form, e.g., pellets or grains, that may require containment in a structural cladding. In any case, the cladding may take the form of a tube, box, or vessel within which the fuel is placed. The fuel and cladding combinations are often referred to as a "fuel element", "fuel rod", or a "fuel pin".

Fuel clad chemical interaction (FCCI) in metallic fuel systems refers to the degradation of fuel elements due to the chemical reaction between the fuel and clad components. The chemical interaction is due, at least in part, to multi-component interdiffusion of species from the cladding into the fuel and vice versa. Specifically, diffusion couple and irradiation experiments both demonstrate migration of clad components (iron and nickel) into the fuel, while fission products (primarily the lanthanides like cerium, neodymium, and praseodymium) diffuse outward into the clad.

FCCI leads to two primary concerns: reduction of clad mechanical properties from formation of brittle intermetallic compounds and wastage/thinning of the cladding, and formation of relatively low melting compositions within the fuel and clad interface. These concerns ultimately affect performance limits for the fuel system, with the peak inner clad temperature (PICT) being influenced by the low melting point (725° C.) of the uranium-iron eutectic that forms at 33 at % Fe. Additionally, the few occurrences of cladding breaches in the fueled region of rods irradiated in EBR-II exhibited extensive FCCI adjacent to the breach locations (max penetrations up to 170 μm into the clad), implicating FCCI as a primary contributor to these breaches.

Although sodium-bonded metal fuel pins have been irradiated to peak burnups up to 20 at % with manageable amounts of FCCI, these irradiations typically were performed over the course of two to four years. Beyond the higher peak burnups (30 at %) required for a traveling wave reactor (TWR) application, the extended service time at temperature greatly compounds the concerns of degradation due to FCCI.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

This disclosure describes various configurations and components for bimetallic and trimetallic claddings for use as a wall element separating nuclear material from an external environment. The cladding materials are suitable for use as cladding for nuclear fuel elements, particularly for fuel elements that will be exposed to sodium or other coolants or environments with a propensity to react with the nuclear fuel.

Two Layer Steel-Vanadium Alloy Claddings

Structural Steel Layer with Carbon-doped Vanadium Liner

Figure 1:
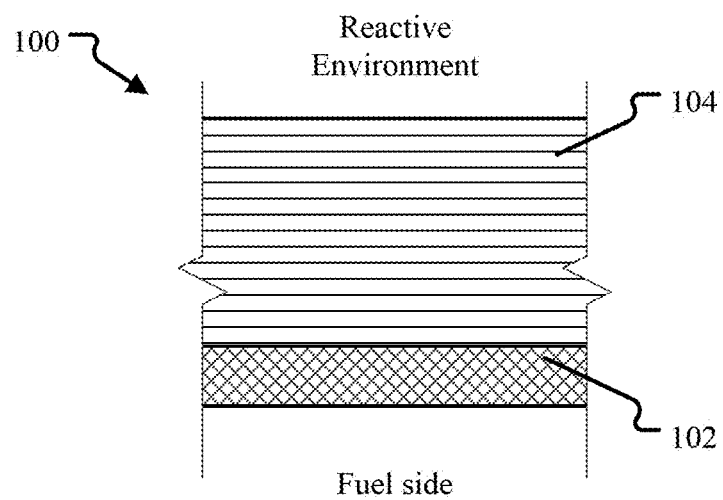
FIG. 1 illustrates a cut away view of a linear section of cladding, or wall element, showing the two-layer construction of a cladding having a structural outer layer.

FIG. 1 illustrates a cut away view of a linear section of cladding, or wall element, showing the two-layer construction of the cladding. The cladding 100 may be part of any structural component that separates nuclear fuel from a reactive, external environment. For example, the cladding 100 may be part of a wall of a tube containing nuclear fuel, a vessel or any other shape of storage container. In an alternative embodiment, rather than being a section of wall of a container, the cladding may be the resulting layers on the surface of a solid nuclear fuel created by some deposition or cladding technique. These techniques, such as electroplating, thermal spray coating, chemical vapor deposition, sputtering, ion implantation, ion plating, sputter deposition, laser surface alloying, hot dipping, and annealing to name but a few, are well known in the art and, depending on the desired end cladding properties, any suitable technique may be used.

Regardless of the manufacturing technology used, the cladding 100 shown in FIG. 1 consists of two layers 102, 104 of material: a first layer 102 and a second, structural, layer 104 that is the structural element of the cladding. The first layer 102 separates the fuel, or the storage area where the fuel will be placed if the fuel has not been provided yet, from the structural layer 104. The first layer 102 acts as a liner that protects the structural layer 104 from contact with the fuel. The second layer 104 is between the first layer 102 and the external environment. Thus, the first layer 102 is a layer of material with one surface exposed to the fuel and the other surface exposed to the second layer 104 while the second layer 104 has a first-layer-facing surface and a surface exposed to the external environment.

The cladding 100 illustrated in FIG. 1 has a first layer 102 of a material selected to reduce the effects of FCCI on both the properties of the first layer 102 and the stored fuel and also selected to reduce the effects of detrimental chemical interactions between the second layer 104 and first layer 102. In an embodiment, the first layer 102 is carbon-doped vanadium and the second layer is a steel. To reduce the interaction between the steel and the carbon-doped vanadium layers, in an embodiment the carbon-doped vanadium is doped with at least 0.001 wt. % (10 ppm) carbon. This will reduce the amount of decarburization observed in the steel and reduce the degradation of the steel while in use as a fuel element.

In an embodiment the carbon-doped vanadium is a vanadium carbon alloy consisting of at least 99.0 wt. % V; 0.001-0.5 wt. % C; with the balance other elements, wherein the carbon-doped vanadium includes not greater than 0.1 wt. % of any one of the other elements, and wherein the total of the other elements does not exceed 0.5 wt. %. In more pure embodiments, the total of the other elements (i.e., the total of the composition that is not V or C) does not exceed 0.05, 0.025, or 0.01 wt. % of the alloy. In one specific embodiment, for example, the carbon range is from 0.1 to 0.3 wt. % C, the total of the other elements (everything that is not V or C) combined is less than 0.5 wt. %, and the balance is V. In another specific embodiment, for example, the carbon range is from 0.1 to 0.3 wt. % C, the total of the other elements (everything that is not V or C) combined is less than 0.1 wt. %, and the balance is V.

The steel layer 104 may be any suitable steel. Examples of suitable steels include a martensitic steel, a ferritic steel, an austenitic steel, a FeCrAl alloy, an oxide-dispersion strengthened steel, T91 steel, T92 steel, HT9 steel, 316 steel, and 304 steel. The steel may have any type of microstructure. For example, in an embodiment substantially all the steel in the layer 104 has at least one phase chosen from a tempered martensite phase, a ferrite phase, and an austenitic phase. In an embodiment, the steel is an HT9 steel or a modified version of HT9 steel.

In one embodiment, the modified HT9 steel is 9.0-12.0 wt. % Cr; 0.001-2.5 wt. % W; 0.001-2.0 wt. % Mo; 0.001-0.5 wt. % Si; up to 0.5 wt. % Ti; up to 0.5 wt. % Zr; up to 0.5 wt. % V; up to 0.5 wt. % Nb; up to 0.3 wt. % Ta; up to 0.1 wt. % N; up to 0.3 wt. % C; and up to 0.01 wt. % B; with the balance being Fe and other elements, wherein the steel includes not greater than 0.15 wt. % of each of these other elements, and wherein the total of these other elements does not exceed 0.35 wt. %. In other embodiments, the steel may have a narrower range of Si from 0.1 to 0.3 wt. %. The steel of the steel layer 104 may include one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta.

Figure 2:
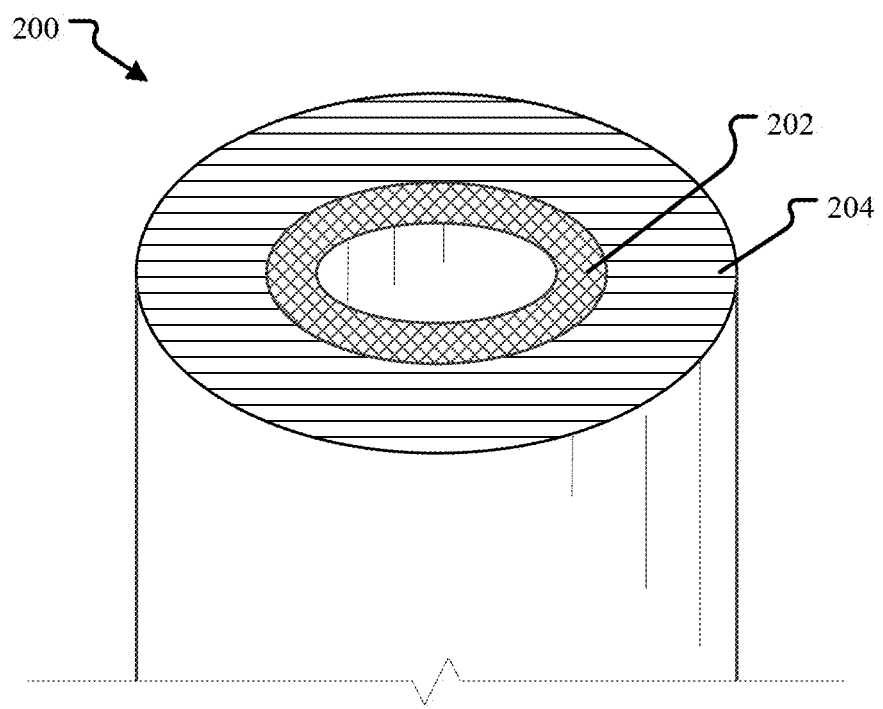
FIG. 2 illustrates a tubular embodiment of the cladding of FIG. 1.

FIG. 2 illustrates a tubular embodiment of the cladding of FIG. 1. In the embodiment shown, the wall element 200 is in the form of a tube with an interior surface and an exterior surface, the first layer 202 of carbon-doped vanadium forming the interior surface of the tube and the second layer 204 of steel forming the exterior surface of the tube. The fuel storage region is in the center of the tube. Fuel within the tube is thus protected from the reactive external environment at the same time the steel layer 104 is separated from the fuel.

The general term wall element is used herein to acknowledge that a tube, vessel or other shape of container may have multiple different walls or sections of a wall of the cladding 100 as illustrated in FIG. 1. That is, the container has a shape that is defined by one or more continuously connected wall elements to form a vessel. However, embodiments of claddings include those that have one or more wall elements that are constructed of materials that are not the cladding 100 as illustrated in FIG. 1 as well as wall elements of the cladding 100. For example, a tube may have a cylindrical wall element of the cladding 100 described in FIG. 1 and FIG. 2 but have end walls of a different construction. Likewise, a cube-shaped fuel container may have sidewalls and a bottom wall constructed as shown in FIG. 1, but a top of different construction.

Figure 3:
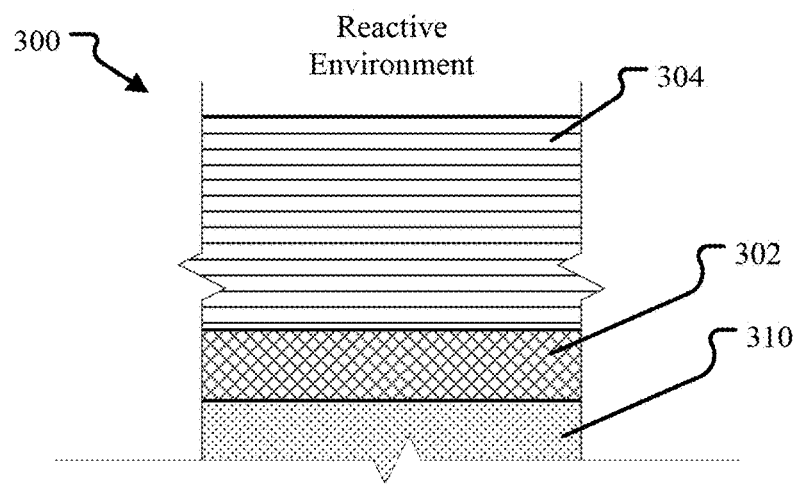
FIG. 3 illustrates the wall element of FIG. 1 in contact with nuclear material.

FIG. 3 illustrates the wall element of FIG. 1, but this time with nuclear material 310, including but not limited to nuclear fuel, in contact with the carbon-doped vanadium layer 302. The steel layer 304 may be any thickness (i.e., the shortest distance between the exterior surface of the steel layer 304 that is exposed to the reactive environment and the vanadium layer 302) as necessary to provide the strength properties desired for the cladding. The carbon-doped vanadium layer 302 may have a thickness from that of a thin coating (0.1% of the thickness of the structural layer 304) up to 50% of the thickness of the structural layer 304. For example, embodiments of the carbon-doped vanadium layer have a thickness, as a percentage of the steel layer's thickness, of between any of 0.1%, 0.5%, 1.0%, 2.5%, 5%, 10%, 15%, 20% and 25% on the low end up to 5%, 10%, 15%, 20%, 25%, 30%, 35%, 40%, 45% and 50% on the high end. Embodiments of the wall elements include the ranges that are any combination of the upper and lower limits provided above. For example, the above specifically includes embodiments of carbon-doped vanadium layers having ranges from 1-5%, from 0.1-10%, from 20-45%, and from 0.1-50% of the thickness of the steel layer. However, regardless of the thickness of the carbon-doped vanadium layer the primary structural element of the wall element 300 is the steel layer 304.

Figure 4:
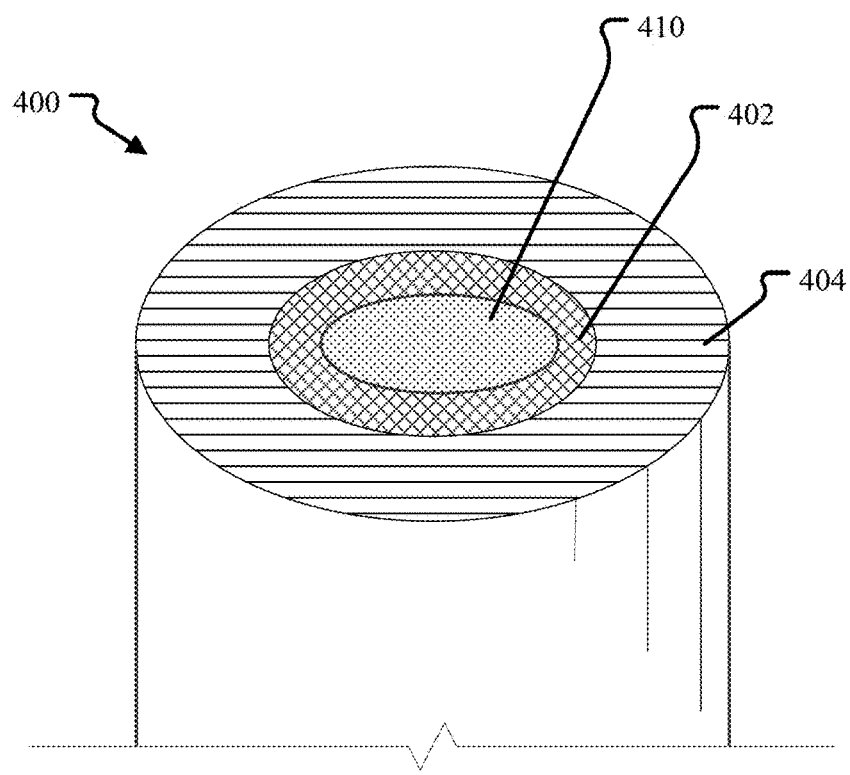
FIG. 4 illustrates a tubular embodiment of the cladding of FIG. 2 with nuclear material contained within the tubular cladding.

FIG. 4, likewise, illustrates a tubular embodiment of the cladding of FIG. 2, but this time with nuclear material 410, including but not limited to nuclear fuel, in the hollow center of the tube 400. The steel layer 404, again, may be any thickness as necessary to provide the strength properties desired for the cladding. The carbon-doped vanadium layer

402 may have a thickness from that of a thin coating (0.1% of the thickness of the structural layer 404) up to 50% of the thickness of the structural layer 404. However, regardless of the thickness of the carbon-doped vanadium layer the primary structural element of the wall element 400 is the steel layer 404.

In an alternative embodiment, the claddings shown in FIGS. 1-4 may be provided with a third, intermediate layer between the steel structural layer and the carbon-doped vanadium layer to further reduce interaction between the steel and the carbon-doped vanadium. Embodiments of suitable intermediate layers are described below with reference to FIGS. 9-12.

For the purposes of this application, nuclear material includes any material containing an actinide, regardless of whether it can be used as a nuclear fuel. Thus, any nuclear fuel is a nuclear material but, more broadly, any materials containing a trace amount or more of U, Th, Am, Np, and/or Pu are nuclear materials. Other examples of nuclear materials include spent fuel, depleted uranium, yellowcake, uranium dioxide, metallic uranium with zirconium and/or plutonium, thorium dioxide, thorianite, uranium chloride salts such as salts containing uranium tetrachloride and/or uranium trichloride.

Nuclear fuel, on the other hand, includes any fissionable material. Fissionable material includes any nuclide capable of undergoing fission when exposed to low-energy thermal neutrons or high-energy neutrons. Furthermore, fissionable material includes any fissile material, any fertile material or combination of fissile and fertile materials. A fissionable material may contain a metal and/or metal alloy. In one embodiment, the fuel may be a metal fuel. It can be appreciated that metal fuel may offer relatively high heavy metal loadings and excellent neutron economy, which is desirable for breed-and-burn process of a nuclear fission reactor. Depending on the application, fuel may include at least one element chosen from U, Th, Am, Np, and Pu. In one embodiment, the fuel may include at least about 90 wt. % U—e.g., at least 95 wt. %, 98 wt. %, 99 wt. %, 99.5 wt. %, 99.9 wt. %, 99.99 wt. %, or higher of U. The fuel may further include a refractory material, which may include at least one element chosen from Nb, Mo, Ta, W, Re, Zr, V, Ti, Cr, Ru, Rh, Os, Ir, and Hf In one embodiment, the fuel may include additional burnable poisons, such as boron, gadolinium, or indium. In addition, a metal fuel may be alloyed with about 3 wt. % to about 10 wt. % zirconium to dimensionally stabilize the fuel during irradiation and to inhibit low-temperature eutectic and corrosion damage of the cladding.

Examples of reactive environments or materials from which the nuclear material is separated from includes reactor coolants such as $NaCl$—$MgCl_2$, Na, NaK, supercritical $CO_2$, lead, and lead bismuth eutectic.

Structural Vanadium Alloy Layer with Steel Liner

Figure 5:
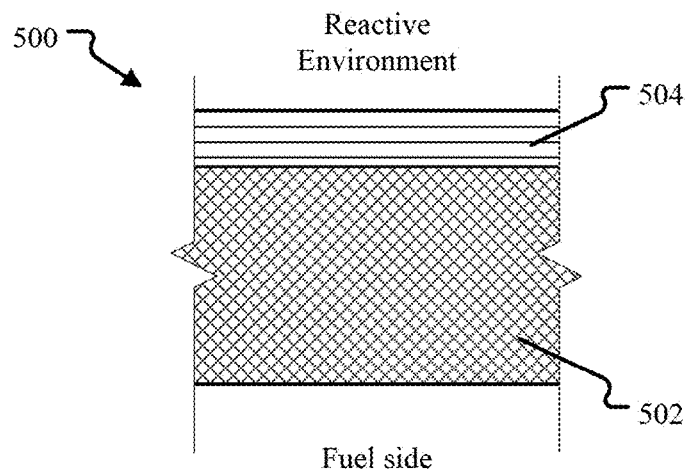
FIG. 5 illustrates a cut away view of a linear section of cladding, or wall element, showing the two-layer construction of a cladding having a structural inner vanadium alloy layer.

FIG. 5 illustrates a cut away view of a linear section of cladding, or wall element, showing the two-layer construction of a cladding having a structural vanadium alloy inner layer. Again, the cladding 500 may be part of any structural component that separates nuclear fuel from a reactive, external environment. For example, the cladding 500 may be part of a wall of a tube containing nuclear fuel, a vessel or any other shape of storage container. In an alternative embodiment, rather than being a section of wall of a container, the cladding may be the resulting layers on the surface of a solid nuclear fuel created by some deposition or cladding technique. These techniques, such as electroplating, thermal spray coating, chemical vapor deposition, sputtering, ion implantation, ion plating, sputter deposition, laser surface alloying, hot dipping, and annealing to name but a few, are well known in the art and depending on the desired end cladding properties any suitable technique may be used.

Regardless of the manufacturing technology used, the cladding 500 shown in FIG. 5 consists of two layers 502, 504 of material. The first layer 502 is the primary structural element of the cladding and separates the fuel, or the storage area where the fuel will be placed if the fuel has not been provided yet, from the second layer 504. The second layer 504 is between the first layer 502 and the external environment. Thus, the first layer 502 is a layer of material with one surface exposed to the fuel and the other surface exposed to the second layer 504 while the second layer 504 has a first-layer-facing surface and a surface exposed to the external environment.

Similar to the cladding described above with reference to FIGS. 1-4, the cladding 500 illustrated in FIG. 5 has a first layer 502 of a material selected to reduce the effects of FCCI on both the structural properties of the first layer 502 and the stored fuel and also selected to reduce the effects of detrimental chemical interactions between the second layer 504 and first layer 502.

In an embodiment, the first layer 502 is a vanadium alloy containing at least 90% V and the second layer 504 is a steel. Vanadium alloys that may be used in the first layer 502 include without limitation vanadium carbon alloys, V-20Ti, V-10Cr-5Ti, V-15Cr-5Ti, V-4Cr-4Ti, V-4Cr-4Ti NIFS Heats 1 & 2, V-4Cr-4Ti US Heats 832665 & 8923864, and V-4Cr-4Ti Heat CEA-J57. In an embodiment, the vanadium alloy consists of 3.0-5.0 wt. % Cr; 3.0-5.0 wt. % Ti; and no more than 0.02 wt. % C; with the balance being V and other elements, wherein the vanadium alloy includes not greater than 0.1 wt. % of each of these other elements, and wherein the total of these other elements does not exceed 0.5 wt. %. This purity requirement may require special refining of the V and Ti, such as double- or triple-melting of the Ti or electro-refining of the V. In more pure embodiments, the total of these other elements does not exceed 0.4, 0.25, or even 0.1 wt. % of the alloy. The carbon range, depending on the embodiment, may be from 0.0001 to 0.02 wt. % C. The vanadium alloy may include one or more carbide precipitates of Cr, Ti and/or other elements.

One particular V-4Cr-4Ti embodiment is provided in TABLE 1, below.

TABLE 1

| Element | Wt. Fraction |
| --- | --- |
| V | Bal. |
| Cr | 3.5-4.5 |
| Ti | 3.5-4.5 |
| Si | 400-1000 ppm |
| O | <200 ppm |
| N | <200 ppm |
| C | <200 ppm |
| Al | <200 ppm |
| Fe | <200 ppm |
| Cu | <10 ppm |
| Mo | <10 ppm |
| Nb | <10 ppm |
| P | <10 ppm |
| S | <10 ppm |
| Cl | <2 ppm |
| Total of all other elements | <100 ppm and not greater than 0.001 wt. % of any one of the other elements. |

For the embodiment shown in TABLE 1, one suitable manufacturing process is as follows. The source of raw materials may be iodide or electro-refined vanadium with low impurity content and, in an embodiment, the calcium-reduction process is not used to obtain the vanadium. In an embodiment, the titanium source does not include sponge titanium in order to reduce Cl, K, and Na impurities and double- or triple-melting of the titanium feedstock is to be performed to achieve the necessary purity level. The V-4Cr-4Ti may be melted using an appropriate method such as laser beam melting, vacuum arc melting, or cold cathode induction melting, in order to prevent contamination. The ingot is then homogenized to reduce local inhomogeneity of Cr and Ti to <+/<0.3 wt. %. The subsequent ingot is then encapsulated in stainless steel and extruded or hot worked at a temperature from 1100-1300° C. and subsequently warm-rolled at a temperature from 300-900° C. to the final billet size required for bimetallic cladding tube fabrication. One or more intermediate anneals during hot work may be performed at 800-1200° C. for up to three hours in a vacuum furnace. One or more similar anneals may be performed as part of any cold work processing. The anneals during cold work may involve a sequence of anneals from 900-1000° C. (e.g., at 950±10° C.) to soften the vanadium followed by one or more anneals from 700-780° C. to transform the HT9 from martensite to ferrite. Final heat treatment of the bimetallic cladding tube product is performed at 1075±10° C. for 20 minutes with an air cool to room temperature followed by 650-700° C. for 1-3 hours and a rapid cooling rate.

The steel layer 504 may be any suitable steel as described above with reference to FIGS. 1-4. For example, in one embodiment the steel is the modified HT9 steel having 9.0-12.0 wt. % Cr; 0.001-2.5 wt. % W; 0.001-2.0 wt. % Mo; 0.001-0.5 wt. % Si; up to 0.5 wt. % Ti; up to 0.5 wt. % Zr; up to 0.5 wt. % V; up to 0.5 wt. % Nb; up to 0.3 wt. % Ta; up to 0.1 wt. % N; up to 0.3 wt. % C; and up to 0.01 wt. % B; with the balance being Fe and other elements, wherein the steel includes not greater than 0.15 wt. % of each of these other elements, and wherein the total of these other elements does not exceed 0.35 wt. %. In other embodiments, the steel may have a narrower range of Si from 0.1 to 0.3 wt. %. The steel of the steel layer 104 may include one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta.

As mentioned above, the vanadium alloy layer 502 is the primary structural element of the cladding. That is, the vanadium alloy layer 502 is the layer that provides most of the solid structure maintaining the shape of the fuel element and preventing failure of the cladding and release of nuclear material. The steel layer 504 may be nothing more than a coating of steel on the external surface of the vanadium alloy layer 502. In these embodiments, the vanadium alloy layer is at least twice as thick as the steel layer 504. That is, the steel layer 504 may be as little as 0.001% the thickness of the vanadium alloy layer 502 and up to 50% the thickness of the vanadium alloy layer 502. In various embodiments, the steel layer thickness may be from 0.01%, 0.1% or 1% of the thickness of the vanadium alloy layer 502 and up to 5%, 10%, 15%, 20% or 25% of the thickness of the vanadium alloy layer 502.

Figure 6:
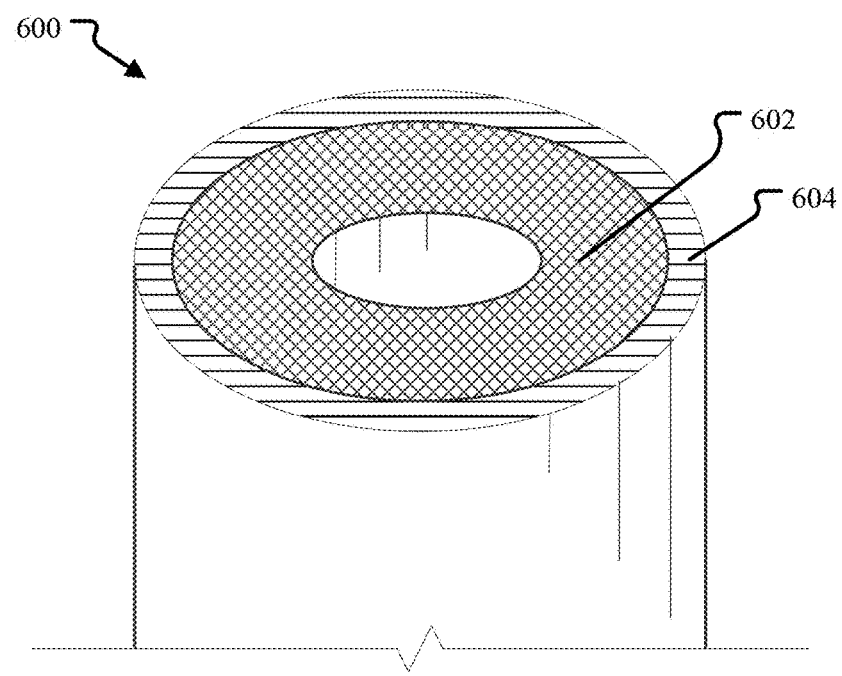
FIG. 6 illustrates a tubular embodiment of the cladding of FIG. 5.

FIG. 6 illustrates a tubular embodiment of the cladding of FIG. 5. In the embodiment shown, the wall element 600 is in the form of a tube with an interior surface and an exterior surface, the first layer 602 of vanadium alloy forming the interior surface of the tube and the second layer 604 of steel forming the exterior surface of the tube. The fuel storage region is in the center region of the tube. Fuel within the tube is thus protected from the reactive external environment at the same time the steel layer 604 is separated from the fuel. Again, the general term wall element is used herein to acknowledge that a tube, vessel or other shape of container may have multiple different walls or sections of a wall of the cladding 500 as illustrated in FIG. 5.

Figure 7:
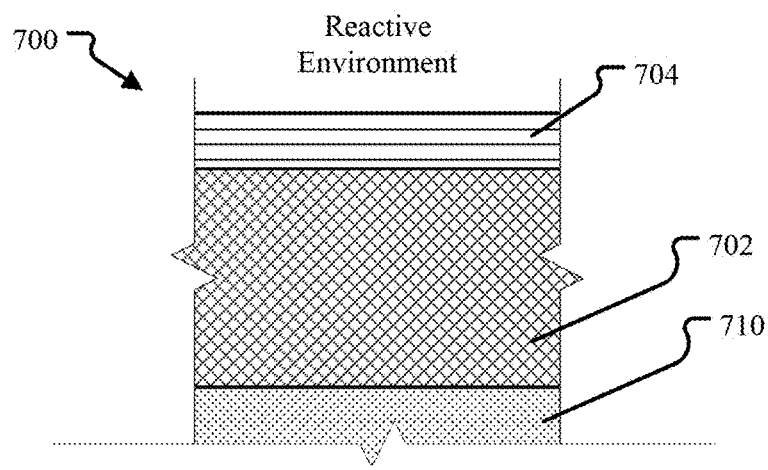
FIG. 7 illustrates the wall element of FIG. 5 in contact with nuclear material.

FIG. 7 illustrates the wall element of FIG. 5, but this time with nuclear material 710, including but not limited to nuclear fuel, in contact with the vanadium layer 702. The steel layer 704, again, may be any thickness from a thin coating up to 50% of the thickness of the vanadium alloy structural layer 702.

Figure 8:
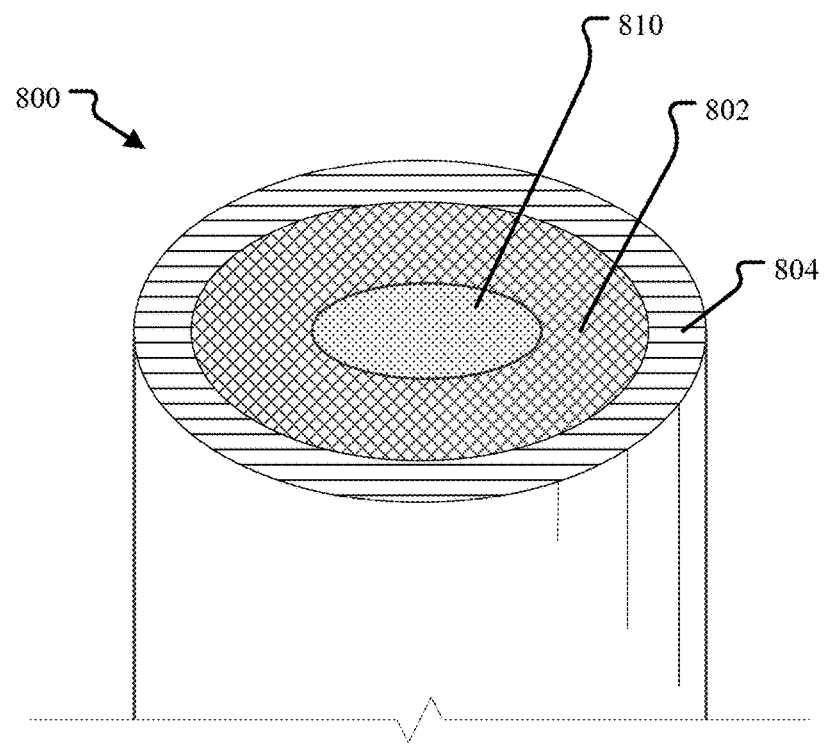
FIG. 8 illustrates a tubular embodiment of the cladding of FIG. 6 with nuclear material contained within the tubular cladding.

FIG. 8, likewise, illustrates a tubular embodiment of the cladding of FIG. 6, but this time with nuclear material 810, including but not limited to nuclear fuel, in the hollow center of the tube 800. The steel layer 804, again, may be any thickness from a thin coating up to 50% of the thickness of the vanadium layer 802, however, the primary structural element is the vanadium alloy layer 802.

In an alternative embodiment, the claddings shown in FIGS. 5-8 may be provided with a third, intermediate layer between the vanadium alloy structural layer and the steel layer to further reduce interaction between the steel and the vanadium alloys. Embodiments of suitable intermediate layers are described below with reference to FIGS. 9-12.

Three Layer Steel-Vanadium Claddings

In addition to the bi-metallic cladding embodiments, tri-metallic versions of the above claddings may also be useful. Tri-metallic cladding embodiments involve providing an intermediate layer between the steel and vanadium layers described above to reduce interaction between the steel and the vanadium layers. These embodiments include claddings in which the steel layer is the structural layer and claddings in which the vanadium layer is vanadium alloy and acts as the structural layer. In either embodiment, the intermediate layer acts as a barrier to prevent interaction between the steel and the vanadium. In the embodiments in which the steel layer the structural element of the cladding, any of the vanadium materials described herein are suitable for the vanadium layer. In FIGS. 9-12, the tri-metallic cladding embodiment having an intermediate layer with a structural steel layer is specifically illustrated, however, the description discusses multiple tri-metallic cladding embodiments.

Figure 9:
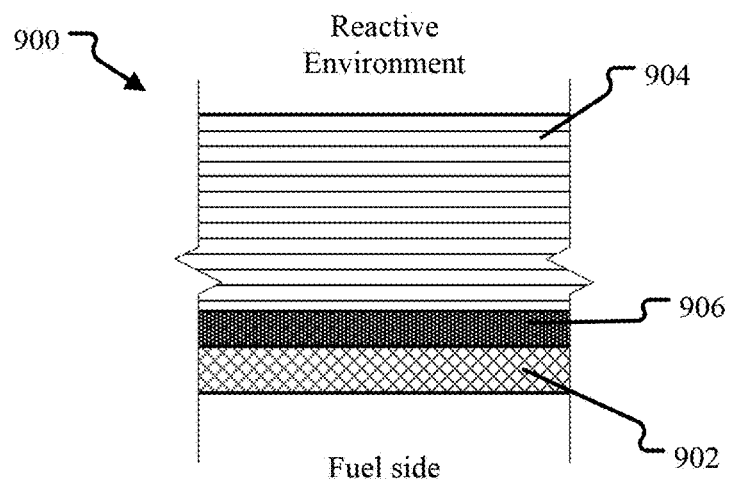
FIG. 9 illustrates a cut away view of a linear section of another embodiment cladding, or wall element, having a three-layer construction.

FIG. 9 illustrates a cut away view of a linear section of another embodiment cladding, or wall element, having a three-layer construction. As with the cladding embodiments discussed above, the vanadium material used in the first layer 902 is again selected to reduce the effects of FCCI on both the properties of the first layer 902 and the fuel to be used in the fuel element. The outer layer 904 is steel, also as described above.

In the cladding 900 illustrated, the middle, or intermediate, layer 906 acts as a liner between the steel layer 904 and the vanadium layer 902. In the embodiment shown, the steel layer 904 is the primary structural component of the fuel cladding 900. In this embodiment the steel layer 904 is the thickest layer in order to provide the structural support for the cladding 900. The steel layer 904 may be 50% or more of the total thickness of the cladding 900. For example, embodiments of the steel layer 904 range from lower bounds of 50, 60, 70, 75, 80, 90, 95, 99 or even 99.9% of the total thickness of the cladding 900. The upper bound is limited to some amount less than 100% in which the middle and vanadium layers are sufficient to provide some protection from FCCI. For example, upper bounds of from 75, 80, 90, 95, 99, 99.9 or even 99.999% of the total thickness of the cladding 900 are contemplated. The balance of the thickness is made up by the other two layers. Thus, in a broad embodiment, the cladding may be considered a thick, steel layer facing the coolant, a thin, fuel-side vanadium alloy or carbon-doped vanadium layer, and a thin, protective layer between the two wherein by 'thin' it is meant no more than 10% of the total thickness of the cladding. For example, specifically in one embodiment the steel layer 904 of the cladding 900 is at least 99% of the total cladding thickness with each of the middle layer 906 and vanadium alloy layer 902 being from 0.0001% to 0.9% of the total cladding thickness.

The materials used in the first layer 902 may be any of those vanadium materials described with reference to FIGS. 1-4 or vanadium alloys described with reference to FIGS. 5-8, above.

Likewise, the materials used in the outer steel layer 906 may be any of those steels described with reference to FIGS. 1-8, above. In one embodiment, for example, the steel is the modified HT9 steel defined above.

The middle layer 906 is made of a material that has less chemical interaction with the vanadium layer 902 than the steel in the steel layer 904 has with the vanadium alloy layer 902. In this way, the middle layer 906 acts as a protective barrier between the fuel-side vanadium layer 902 and the outside steel layer 904.

In an embodiment, the material of the middle layer 906 is selected from nickel, nickel alloy, chromium, chromium alloy, zirconium or zirconium alloy. In nickel embodiments, the material is substantially pure, that is, at least 99.9 wt. % Ni; with the balance other elements, wherein the material includes not greater than 0.05 wt. % of each of these other elements, and wherein the total of these other elements does not exceed 0.1 wt. %. In more pure embodiments, the total of these other elements does not exceed 0.025; 0.01, or 0.005 wt. % of the material. In nickel alloy embodiments, the material is at least 90.0 wt. % Ni; with the balance other elements, wherein the material includes not greater than 5.0 wt. % of each of these other elements, and wherein the total of these other elements does not exceed 10.0 wt. %. In more pure embodiments, the total of these other elements does not exceed 2.5; 1, or 0.5 wt. % of the nickel alloy.

In chromium embodiments, the material is substantially pure, that is, at least 99.9 wt. % Cr; with the balance other elements, wherein the material includes not greater than 0.05 wt. % of each of these other elements, and wherein the total of these other elements does not exceed 0.1 wt. %. In more pure embodiments, the total of these other elements does not exceed 0.025; 0.01, or 0.005 wt. % of the material. In chromium alloy embodiments, the material is at least 90.0 wt. % Cr; with the balance other elements, wherein the material includes not greater than 5.0 wt. % of each of these other elements, and wherein the total of these other elements does not exceed 10.0 wt. %. In more pure embodiments, the total of these other elements does not exceed 5, 2.5; 1, or 0.5 wt. % of the chromium alloy.

In zirconium embodiments, the material is substantially pure, that is, at least 99.9 wt. % Zr; with the balance other elements, wherein the material includes not greater than 0.05 wt. % of each of these other elements, and wherein the total of these other elements does not exceed 0.1 wt. %. In more pure embodiments, the total of these other elements does not exceed 0.025; 0.01, or 0.005 wt. % of the material. In zirconium alloy embodiments, the material is at least 90.0 wt. % Zr; with the balance other elements, wherein the material includes not greater than 5.0 wt. % of each of these other elements, and wherein the total of these other elements does not exceed 10.0 wt. %. In more pure embodiments, the total of these other elements does not exceed 5, 2.5; 1, or 0.5 wt. % of the zirconium alloy.

In the embodiment shown, the steel layer is structural support for the cladding, having thicknesses as described above with reference to FIGS. 1-4, and the middle layer 906 and vanadium layer 902 are the thinner layers of the cladding. In an embodiment not shown, the vanadium layer 902 is the thicker, structural layer, having thicknesses as described with reference FIGS. 5-8, and the middle layer 906 and steel layer 904 are the thinner layers of the cladding. As with FIGS. 1-8, however, the steel layer 904 is the outer layer and the vanadium layer 902 is the inner layer.

Figure 10:
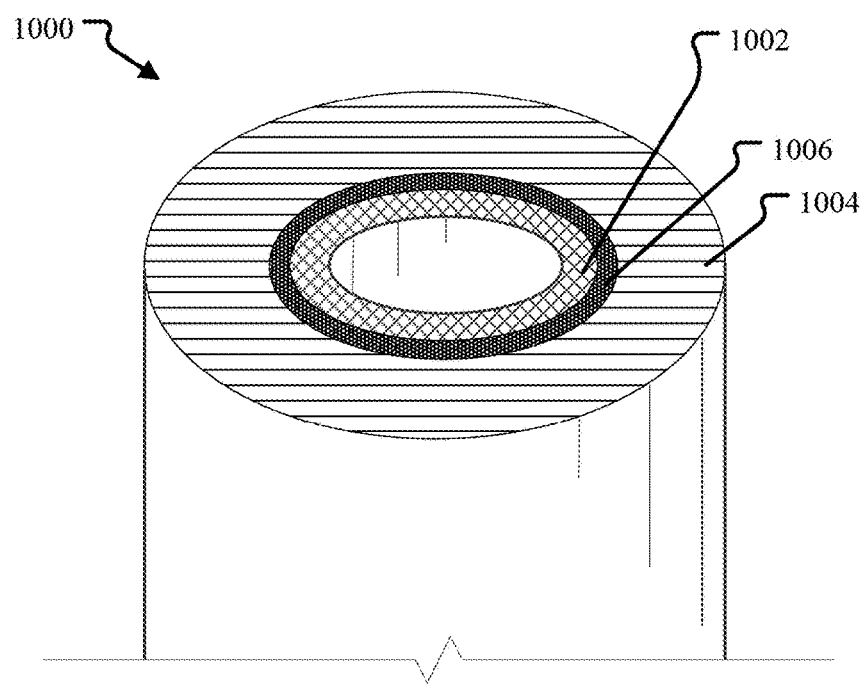
FIG. 10 illustrates a tubular embodiment of the cladding of FIG. 9.

FIG. 10 illustrates a tubular embodiment of the cladding of FIG. 9. In the embodiment shown, the wall element 1000 is in the form of a tube with an interior surface and an exterior surface, the first layer 1002 of vanadium alloy forming the interior surface of the tube and the second layer 1004 of steel forming the exterior surface of the tube, the first and second layers being separated by the middle layer 1006. The fuel storage region is in the center region of the tube. Fuel within the tube is thus protected from the reactive external environment at the same time the steel layer 1004 is separated from the fuel. Again, the general term wall element is used herein to acknowledge that a tube, vessel or other shape of container may have multiple different walls or sections of a wall of the cladding 900 as illustrated in FIG. 9.

Figure 11:
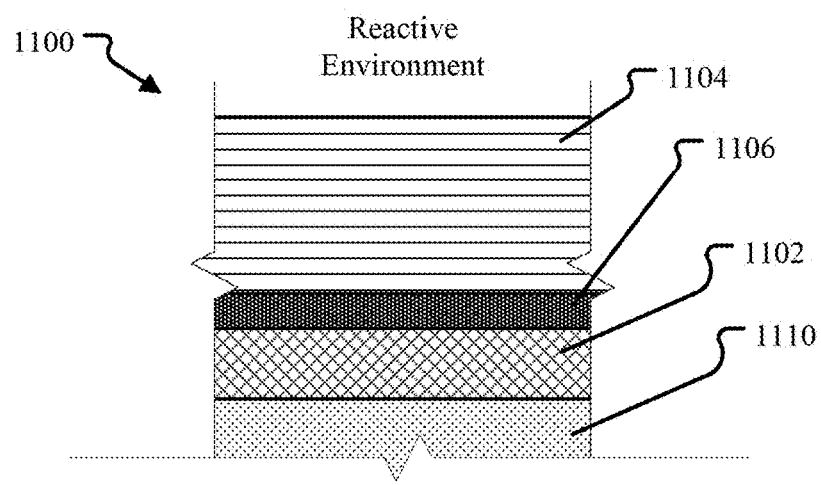
FIG. 11 illustrates the wall element of FIG. 9 in contact with nuclear material.

FIG. 11 illustrates the wall element of FIG. 9, but this time with nuclear material 1110, including but not limited to nuclear fuel, in contact with the vanadium layer 1102 of the wall element 1100. The vanadium layer 1102 is separated from the steel layer 1104 by the middle layer 1106.

Figure 12:
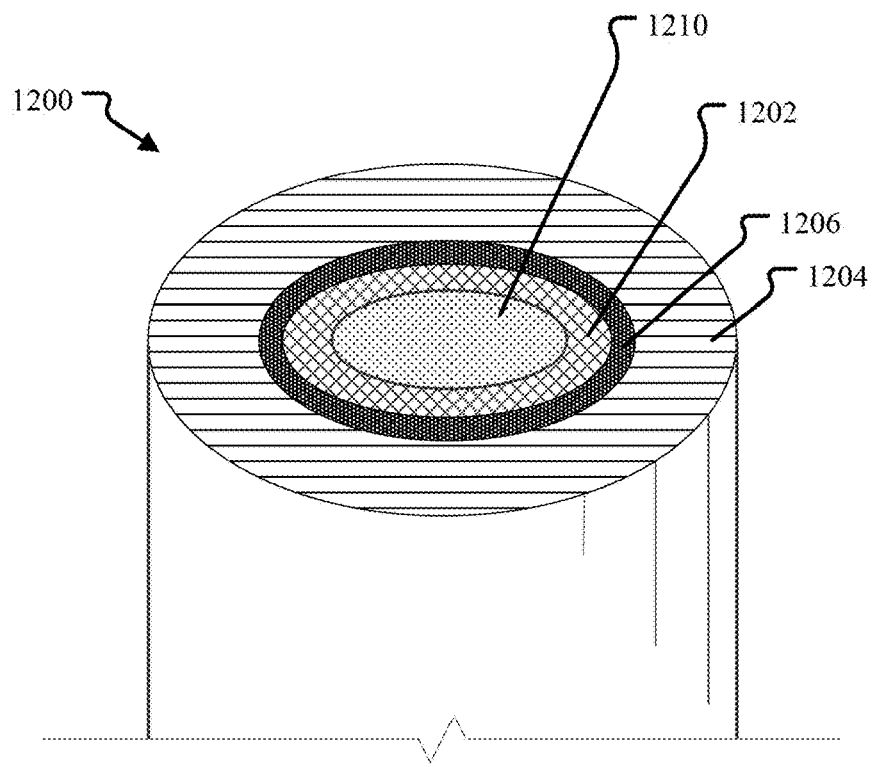
FIG. 12 illustrates a tubular embodiment of the cladding of FIG. 10 containing nuclear material in the hollow center of the tube.

FIG. 12, likewise, illustrates a tubular embodiment of the cladding of FIG. 9, but this time with nuclear material 1210, including but not limited to nuclear fuel, in the hollow center of the tube 1200. Again, the vanadium layer 1202 is separated from the steel layer 1204 by the middle layer 1206.

The three layer steel-vanadium claddings have the benefits of (a) having a steel outer layer to protect the fuel element from exposure to the reactive coolant environment; and (b) the reduced FCCI due to the fuel side vanadium alloy layer. The main structural element may be either of the steel or vanadium layers.

Figure 13:
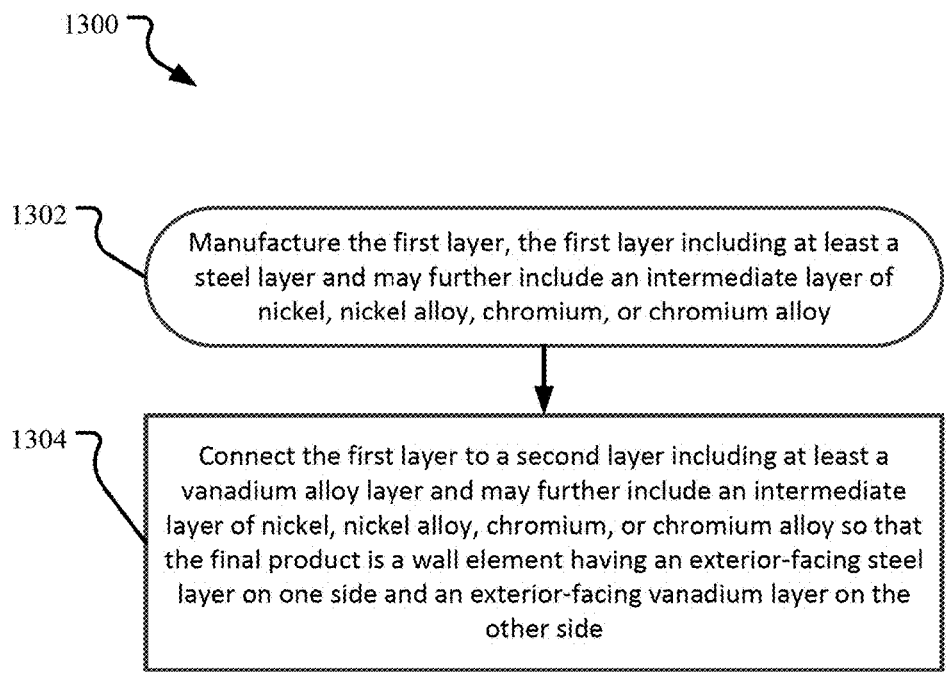
FIG. 13 illustrates a method of manufacturing a two or three layer wall element for separating a nuclear material from an external environment, such as those described above.

FIG. 13 illustrates a method of manufacturing a two or three layer wall element for separating a nuclear material from an external environment, such as those described above. The method 1300 includes manufacturing a first layer, the first layer including at least a steel layer in a first layer manufacturing operation 1302. The first layer is then connected to the second layer that includes at least a layer of vanadium alloy, in a layer connection operation 1304.

In an embodiment of the layer connection operation 1304, the vanadium layer is manufactured prior to connecting the second layer to the first layer. In an alternative embodiment of the layer connection operation 1304, the second layer is created by depositing it onto the first layer.

In an embodiment of the layer connection operation 1304, the second layer consists only of the vanadium alloy layer and includes connecting the steel layer directly to the vanadium alloy layer.

In an embodiment of the first layer construction operation 1302, manufacturing the first layer includes manufacturing a first layer consisting of the steel layer connected to a third layer made of nickel, nickel alloy, chromium, chromium alloy, zirconium or zirconium alloy and the layer connection operation 1304 includes connecting the first layer to the second layer so that the third layer is between the steel layer and the vanadium alloy layer.

In an alternative embodiment, in which the second layer consists of the vanadium alloy layer connected to the third layer of nickel, nickel alloy, chromium, chromium alloy, zirconium or zirconium alloy, the layer connection operation 1304 includes connecting the first layer to the second layer so that the third layer is between the steel layer and the vanadium alloy layer.

Fuel Elements and Fuel Assemblies

Figure 14A:
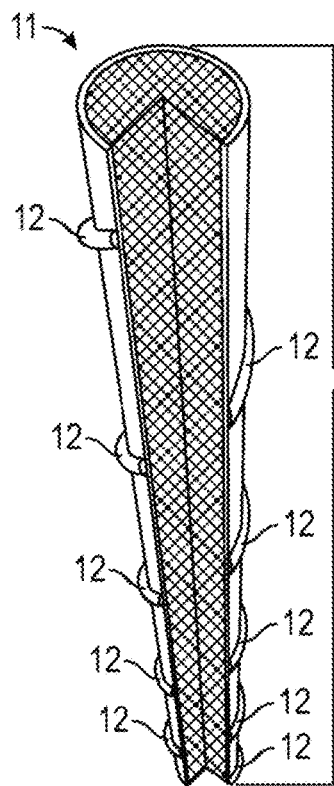
FIGS. 14a and 14b illustrate a nuclear fuel assembly and details of a fuel element.
Figure 14A:
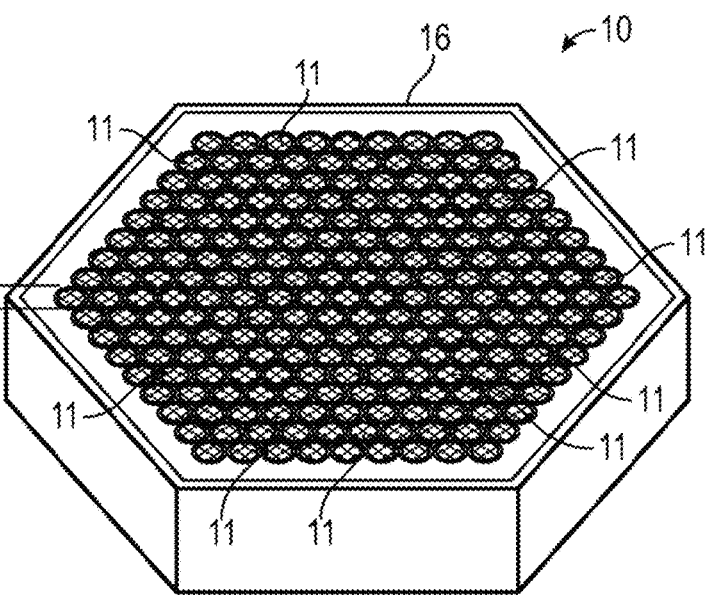
Figure 14B:
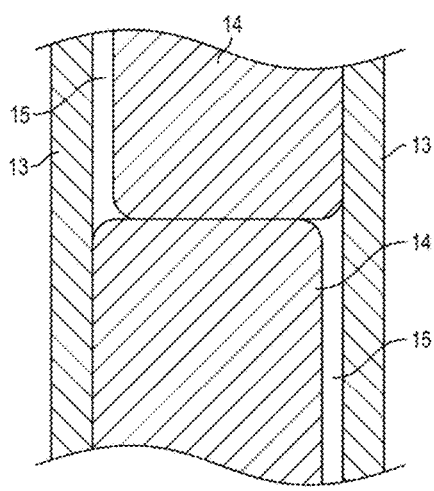

FIG. 14a provides a partial illustration of a nuclear fuel assembly 10 utilizing one or more of the claddings described above. The fuel assembly 10, as shown, includes a number of individual fuel elements (or "fuel rods" or "fuel pins") 11 held within a containment structure 16. FIG. 14b provides a partial illustration of a fuel element 11 in accordance with one embodiment. As shown in this embodiment, the fuel element includes a cladding 13, a fuel 14, and, in some instances, at least one gap 15. Although illustrated as a single element, the cladding 13 is composed of, entirely or at least in part, of the two layer or three layer claddings described above.

A fuel is sealed within a cavity created by the exterior cladding 13. In some instances, the multiple fuel materials may be stacked axially as shown in FIG. 14b, but this need not be the case. For example, a fuel element may contain only one fuel material. In one embodiment, gap(s) 15 may be present between the fuel material and the cladding, though gap(s) need not be present. In one embodiment, the gap is filled with a pressurized atmosphere, such as a pressured helium atmosphere.

In one embodiment, individual fuel elements 11 may have a thin wire 12 from about 0.8 mm diameter to about 1.6 mm diameter helically wrapped around the circumference of the clad tubing to provide coolant space and mechanical separation of individual fuel elements 11 within the housing of the fuel assemblies 10 (that also serve as the coolant duct). In one embodiment, the cladding 13, and/or wire wrap 12 may be fabricated from ferritic-martensitic steel because of its irradiation performance as indicated by a body of empirical data.

The fuel element may have any geometry, both externally and for the internal fuel storage region. For example, in some embodiments shown above, the fuel element is cylindrical and may take the form of a cylindrical rod. In addition, some prismatoid geometries for fuel elements may be particularly efficient. For example, the fuel elements may be right, oblique, or truncated prisms having three or more sides and any polygonal shape for the base. Hexagonal prisms, rectangular prisms, square prisms and triangular prisms are all potentially efficient shapes for packing a fuel assembly.

The fuel elements and fuel assembly may be a part of a power generating reactor, which is a part of a nuclear power plant. Heat generated by the nuclear reaction is used to heat a coolant in contact with the exterior of the fuel elements. This heat is then removed and used to drive turbines or other equipment for the beneficial harvesting of power from the removed heat.

EXAMPLE

Figure 15A:
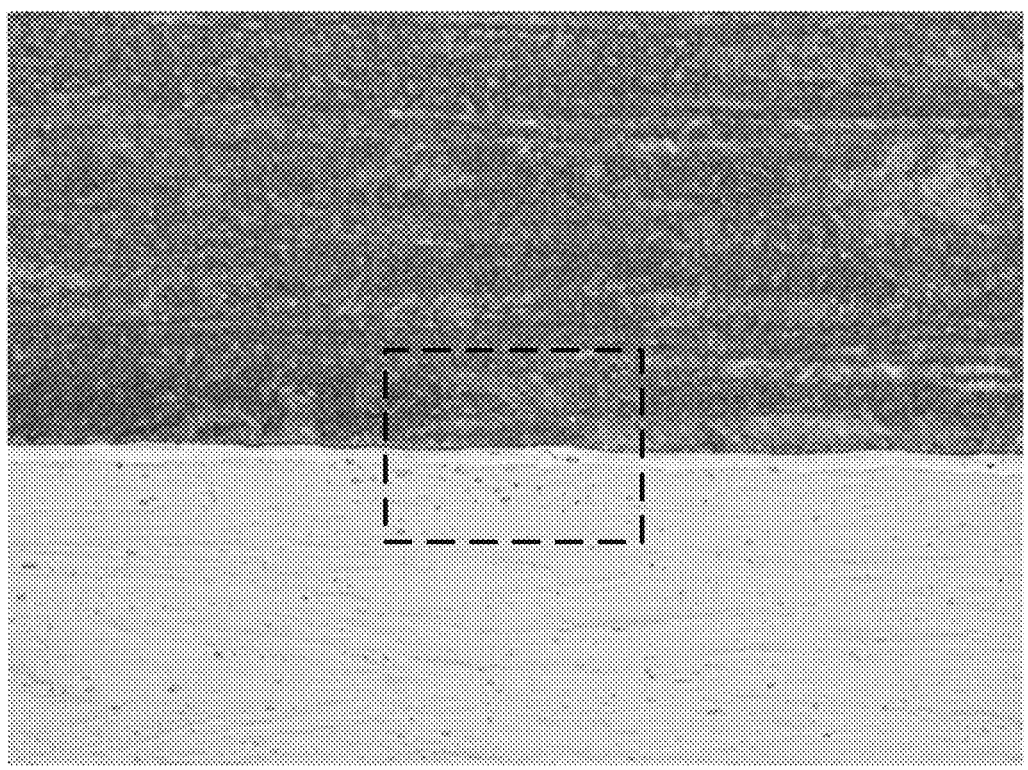
FIGS. 15A and 15B are micrographs of a trimetallic cladding having an intermediate layer of Ni electroplated to a first layer of vanadium doped with carbon on one side and a second layer of HT9 steel on the other.
Figure 15B:

FIGS. 15A and 15B are micrographs of a trimetallic cladding having an intermediate layer of Ni electroplated to a first layer of vanadium doped with carbon on one side and a second layer of HT9 steel on the other. FIG. 15B is an enlargement of the area of the trimetallic cladding shown within the dashed box in FIG. 15A. In the cladding, the vanadium is doped with 0.2 wt. % C.

Figure 15C:
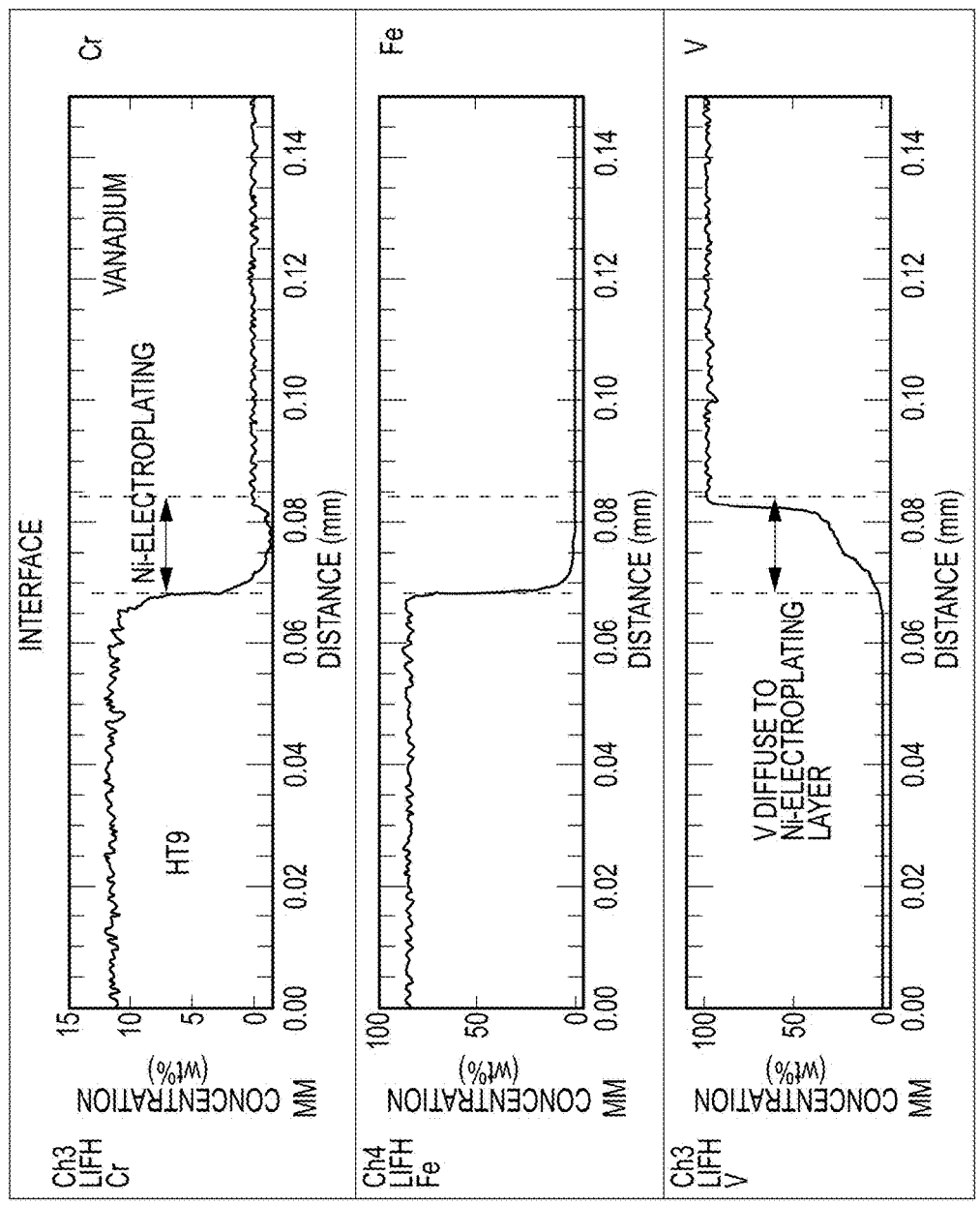
FIGS. 15C and 15D show the chemical composition mapping for the trimetallic claddings of FIGS. 15A and 15B.
Figure 15D:
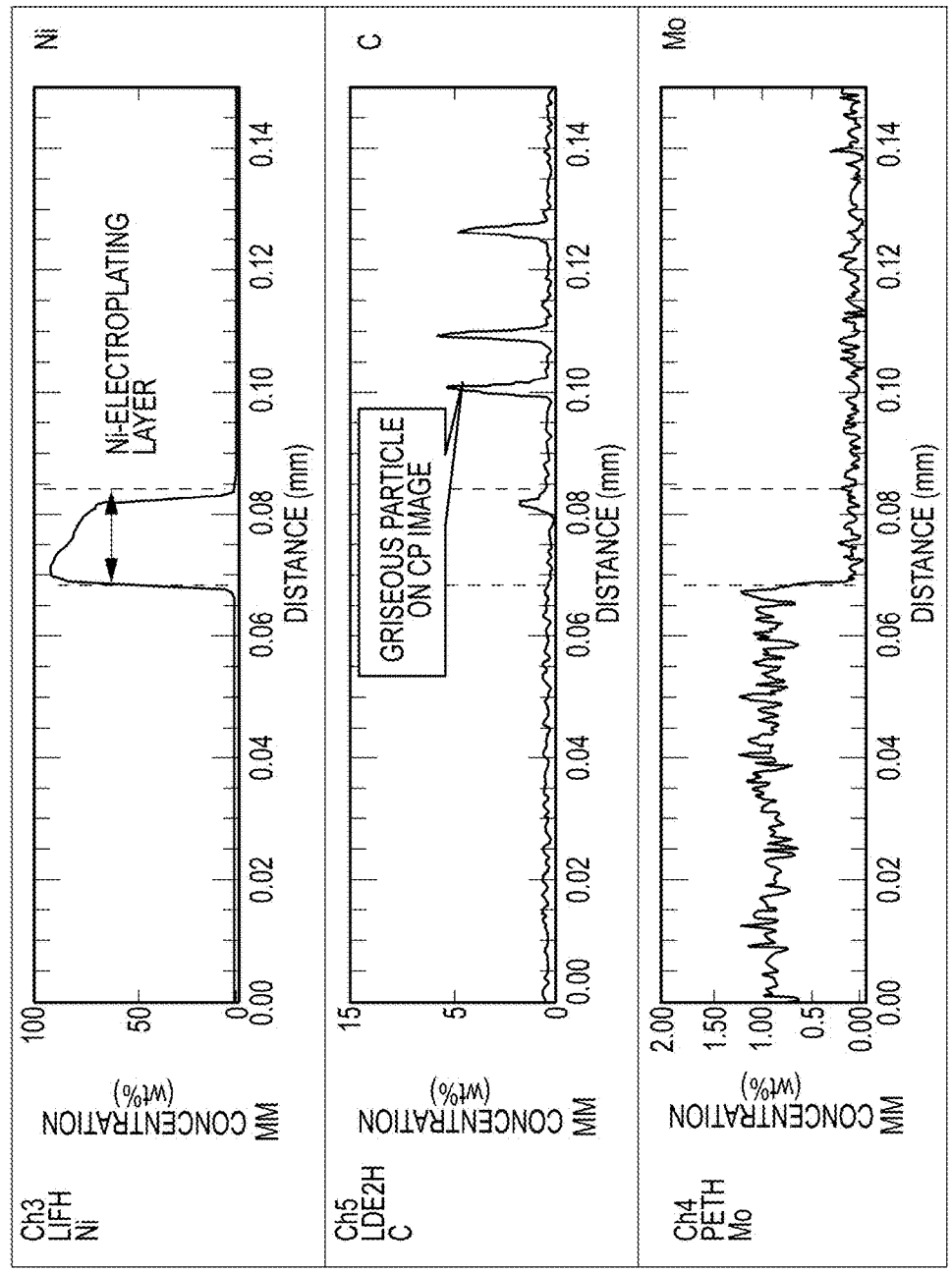

FIG. 15C shows the chemical composition mapping for the trimetallic claddings of FIGS. 15A and 15B. In FIG. 15C the amount and distribution of Cr, Fe, V, Ni, C and Mo through the region around the middle layer are shown. This analysis shows that at least some vanadium diffused into the middle layer, but little or no vanadium made it into the HT9 layer.

Notwithstanding the appended claims, the disclosure is also defined by the following clauses:

1. A wall element consisting of:
   a first layer of steel;
   a second layer of at least 90% vanadium; and
   a third layer of nickel, nickel alloy, chromium, chromium alloy, zirconium or zirconium alloy between the first layer and the second layer.
2. The wall element of clause 1, wherein the second layer has a thickness that is from 0.1% to 50% of the thickness of the first layer and the third layer has a thickness that is from 0.1% to 50% of the thickness of the first layer.
3. The wall element of clause 1, wherein the second layer has a thickness that is from 1% to 5% of the thickness of the first layer and the third layer has a thickness that is from 1% to 5% of the thickness of the first layer.
4. The wall element of clauses 1-3, wherein the second layer is selected from the vanadium alloys V-20Ti, V-10Cr-5Ti, V-15Cr-5Ti, V-4Cr-4Ti, V-4Cr-4Ti NIFS Heats 1 & 2, V-4Cr-4Ti US Heats 832665 & 8923864, and V-4Cr-4Ti Heat CEA-J57.
5. The wall element of clause 4, wherein the second layer is V-4Cr-4Ti.
6. The wall element of clause 4, wherein the second layer consists of:
   3.0-5.0 wt. % Cr;
   3.0-5.0 wt. % Ti; and
   no more than 0.02 wt. % C;
   with the balance being V and other elements, wherein the vanadium alloy includes not greater than 0.1 wt. % of each of these other elements, and wherein the total of these other elements does not exceed 0.5 wt. %.
7. The wall element of clause 5, wherein the second layer consists of:
   3.5-4.5 wt. % Cr;
   3.5-4.5 wt. % Ti;
   0.04-0.1 wt. % Si;
   up to 0.02 wt. % O;
   up to 0.02 wt. % N;
   up to 0.02 wt. % C;
   up to 0.02 wt. % Al;
   up to 0.02 wt. % Fe;
   up to 0.001 wt. % Cu;
   up to 0.001 wt. % Mo;
   up to 0.001 wt. % Nb;
   up to 0.001 wt. % P;
   up to 0.001 wt. % S; and
   no more than 0.0002 wt. % Cl;
   with the balance being V and other elements, wherein the vanadium alloy includes not greater than 0.001 wt. % of each of these other elements, and wherein the total of these other elements does not exceed 0.01 wt. %.

8. The wall element of clauses 1-4, wherein the second layer consists of:
0.001-0.5 wt. % C;
the balance being V and other elements, wherein the second layer includes not greater than 0.1 wt. % of each of these other elements, and wherein the total of these other elements does not exceed 0.5 wt. %.
9. The wall element of clause 8, wherein the second layer includes from 0.1 to 0.3 wt. % C in addition to V.
10. The wall element of any of clauses 1-9, wherein the steel of the first layer is selected from a tempered martensitic steel, a ferritic steel, an austenitic steel, an oxide-dispersion strengthened steel, T91 steel, T92 steel, HT9 steel, 316 steel, and 304 steel.
11. The wall element of any of clauses 1-10, wherein the steel of the first layer consists of:
9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;
up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.
12. The wall element of any of clauses 1-11, wherein the steel includes one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta.
13. The wall element of any of clauses 5-7, wherein the vanadium alloy includes one or more carbide precipitates of Cr, Ti and/or other elements.
14. The wall element of any of clauses 1-13, wherein the first layer is at least 99% of the total thickness of the wall element and wherein with each of the third layer and second layer being from 0.0001% to 0.5% of the thickness of the first layer.
15. The wall element of any of clauses 1-14, wherein the wall element is in the form of a tube with an interior surface and an exterior surface, the first layer forming the interior surface of the tube and the second layer forming the exterior surface of the tube.
16. The wall element of any of clauses 1-15, wherein the third layer consists of:
at least 99.9 wt. % Ni;
with the balance other elements, wherein the material includes not greater than 0.05 wt. % of each of these other elements, and wherein the total of these other elements does not exceed 0.1 wt. %.
17. The wall element of any of clauses 1-15, wherein the third layer consists of:
at least 90.0 wt. % Ni;
with the balance other elements, wherein the material includes not greater than 1.0 wt. % of each of these other elements, and wherein the total of these other elements does not exceed 5.0 wt. %.
18. The wall element of any of clauses 1-15, wherein the third layer consists of:
at least 99.9 wt. % Cr;
with the balance other elements, wherein the material includes not greater than 0.05 wt. % of each of these other elements, and wherein the total of these other elements does not exceed 0.1 wt. %.
19. The wall element of any of clauses 1-15, wherein the third layer consists of:
at least 90.0 wt. % Cr;
with the balance other elements, wherein the material includes not greater than 1.0 wt. % of each of these other elements, and wherein the total of these other elements does not exceed 5.0 wt. %.
20. The wall element of any of clauses 1-15, wherein the third layer consists of:
at least 99.9 wt. % Zr;
with the balance other elements, wherein the material includes not greater than 0.05 wt. % of each of these other elements, and wherein the total of these other elements does not exceed 0.1 wt. %.
21. The wall element of any of clauses 1-15, wherein the third layer consists of:
at least 90.0 wt. % Zr;
with the balance other elements, wherein the material includes not greater than 1.0 wt. % of each of these other elements, and wherein the total of these other elements does not exceed 5.0 wt. %.
22. A container made, at least in part, from wall elements of any of clauses 1-21.
23. A container for holding a nuclear fuel comprising:
at least one wall element separating a fuel storage volume from an external environment;
the wall element having a first layer of steel separated from a second layer of at least 90% vanadium by a third layer between the first layer and the second layer;
the first layer of the wall contacting the external environment and the second layer contacting and the fuel storage volume; and
wherein the third layer consists of nickel, nickel alloy, chromium, chromium alloy, zirconium or zirconium alloy.
24. The container of clause 23, wherein the container has a shape that is defined by one or more continuously connected wall elements to form a vessel.
25. The container of clause 23, wherein the container is shaped as a cylindrical tube, at least one wall element forming a cylindrical wall of the tube and the fuel storage region being the inside of the tube.
26. The container of any of clauses 23-25, wherein the container includes a bottom wall and one or more sidewalls and at least one wall element forms a bottom wall or sidewall of the container.
27. An article, comprising:
an amount of nuclear material;
a wall element disposed exterior to the nuclear fuel and separating at least some of the nuclear material from an exterior environment, the wall element consisting of:
a first layer of steel in contact with the external environment; and
a second layer of at least 90% vanadium in contact with the nuclear material; and
a third layer between the first layer and the second layer, the first layer of nickel inhibiting the transfer of carbon from the steel into the vanadium alloy;
wherein the third layer consists of nickel, nickel alloy, chromium, chromium alloy, zirconium or zirconium alloy.
28. The article of clause 27, wherein the nuclear material includes at least one of U, Th, Am, Np, and Pu.

29. The article of clause 27 or 28, wherein the nuclear material includes at least one refractory material chosen from Nb, Mo, Ta, W, Re, Zr, V, Ti, Cr, Ru, Rh, Os, Ir, Nd, and Hf.

30. The article of any of clauses 27-29, wherein the first layer includes a steel, substantially all of which has at least one phase chosen from a tempered martensite phase, a ferrite phase, and an austenitic phase.

31. The article of any of clauses 27-30, wherein the cladding layer includes at least one steel chosen from a martensitic steel, a ferritic steel, an austenitic steel, an oxide-dispersed steel, T91 steel, T92 steel, HT9 steel, 346 steel, and 304 steel.

32. The article of any of clauses 27-31, wherein the nuclear fuel and the wall element are mechanically bonded.

33. The article of any of clauses 27-32, wherein the exterior environment includes molten sodium and the first layer of steel prevents contact between the sodium and the vanadium in the second layer.

34. The article of any of clauses 27-33, wherein the first layer and the second layer are mechanically bonded to opposite sides of the third layer.

35. The article of any of clauses 27-34, wherein the nuclear material includes at least 90 wt. % of U.

36. The article of any of clauses 27-35, wherein the nuclear material is a nuclear fuel and the article is a nuclear fuel element.

37. The article of any of clauses 27-36, wherein the third layer consists of:
at least 99.9 wt. % Ni;
with the balance other elements, wherein the material includes not greater than 0.05 wt. % of each of these other elements, and wherein the total of these other elements does not exceed 0.1 wt. %.

38. The article of any of clauses 27-36, wherein the third layer consists of:
at least 90.0 wt. % Ni;
with the balance other elements, wherein the material includes not greater than 5.0 wt. % of each of these other elements, and wherein the total of these other elements does not exceed 10.0 wt. %.

39. The article of any of clauses 27-36, wherein the third layer consists of:
at least 99.9 wt. % Cr;
with the balance other elements, wherein the material includes not greater than 0.05 wt. % of each of these other elements, and wherein the total of these other elements does not exceed 0.1 wt. %.

40. The article of any of clauses 27-36, wherein the third layer consists of:
at least 90.0 wt. % Cr;
with the balance other elements, wherein the material includes not greater than 5.0 wt. % of each of these other elements, and wherein the total of these other elements does not exceed 10.0 wt. %.

41. The w article of any of clauses 27-36, wherein the second layer consists of:
0.001-0.5 wt. % C;
the balance being V and other elements, wherein the second layer includes not greater than 0.1 wt. % of each of these other elements, and wherein the total of these other elements does not exceed 0.5 wt. %.

42. A wall element consisting of:
a first layer of steel;
a second layer of vanadium doped with at least 0.001 wt. % carbon on the first layer of steel, the second layer having no more than 0.5 wt. % of other elements besides V and C.

43. The wall element of clause 42 comprising:
a third layer between the first layer and the second layer, the third layer being made of nickel, nickel alloy, chromium, chromium alloy, zirconium or zirconium alloy.

44. The wall element of clause 42 or 43, wherein the second layer consists of:
0.001-0.5 wt. % C;
the balance being V and other elements, wherein the doped vanadium of the second layer includes not greater than 0.1 wt. % of each of these other elements, and wherein the total of these other elements does not exceed 0.5 wt. %.

45. The wall element of any of clauses 42-44, wherein the doped vanadium of the second layer includes from 0.1 to 0.3 wt. % C.

46. The wall element of any of clauses 42-45, wherein the steel of the first layer is selected from a tempered martensitic steel, a ferritic steel, an austenitic steel, an oxide-dispersion strengthened steel, T91 steel, T92 steel, HT9 steel, 316 steel, and 304 steel.

47. The wall element of any of clauses 42-46, wherein the steel of the first layer consists of:
9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;
up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.

48. The wall element of any of clauses 42-47, wherein the steel includes one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta and/or wherein the vanadium alloy includes one or more carbide precipitates of Cr, Ti and/or other elements.

49. The wall element of clause 42, wherein the second layer has a thickness that is from 0.1% to 50% of the thickness of the first layer.

50. The wall element of any of clauses 42-49, wherein the second layer has a thickness that is from 1% to 5% of the thickness of the first layer.

51. The wall element of any of clauses 42-50, wherein the wall element is in the form of a tube with an interior surface and an exterior surface, the first layer forming the interior surface of the tube and the second layer forming the exterior surface of the tube.

52. The wall element of clause 51 further comprising:
an amount of nuclear material within the tube.

53. The article of clause 52, wherein the nuclear material includes one or more elements selected from U, Th, Am, Np, and Pu.

54. The article of clause 52 or 53, wherein the nuclear material includes at least one refractory material chosen from Nb, Mo, Ta, W, Re, Zr, V, Ti, Cr, Ru, Rh, Os, Ir, Nd, and Hf
55. A container for holding a nuclear fuel comprising:
at least one wall element separating a fuel storage region from an external environment;
the wall element having a first layer of steel attached to a second layer of vanadium doped with at least 0.001 wt. % carbon and having no more than 0.5 wt. % of other elements.
the first layer of the wall contacting the external environment and the second layer contacting the fuel storage region.
56. The container of clause 55, wherein the container has a shape that is defined by one or more continuously connected wall elements to form a vessel.
57. The container of clauses 55 or 56, wherein the container is shaped as a cylindrical tube, at least one wall element forming a cylindrical wall of the tube and the fuel storage region being the inside of the tube.
58. The container of any of clauses 55-57, wherein the container includes a bottom wall and one or more sidewalls and at least one wall element forms a bottom wall of the container.
59. The container of any of clauses 55-58, wherein the container includes a bottom wall and one or more sidewalls and at least one wall element forms at least one of the one or more sidewalls of the container.
60. A wall element consisting of:
a first layer of steel;
a second layer of vanadium alloy on the first layer of steel, wherein the first layer of steel is from 0.1% to 50% of the thickness of the second layer.
61. The wall element of clause 60 comprising:
a third layer between the first layer and the second layer, the third layer being made of nickel, nickel alloy, chromium, chromium alloy, zirconium or zirconium alloy.
62. The wall element of clauses 60 or 61, wherein the second layer is selected from the vanadium alloys V-20Ti, V-10Cr-5Ti, V-15Cr-5Ti, V-4Cr-4Ti, V-4Cr-4Ti NIFS Heats 1 & 2, V-4Cr-4Ti US Heats 832665 & 8923864, and V-4Cr-4Ti Heat CEA-J57.
63. The wall element of clause 62, wherein the second layer consists of:
3.0-5.0 wt. % Cr;
3.0-5.0 wt. % Ti; and
no more than 0.02 wt. % C;
with the balance being V and other elements, wherein the vanadium alloy includes not greater than 0.1 wt. % of each of these other elements, and wherein the total of these other elements does not exceed 0.5 wt. %.
64. The wall element of clause 62, wherein the second layer consists of:
3.5-4.5 wt. % Cr;
3.5-4.5 wt. % Ti;
0.04-0.1 wt. % Si;
up to 0.02 wt. % O;
up to 0.02 wt. % N;
up to 0.02 wt. % C;
up to 0.02 wt. % Al;
up to 0.02 wt. % Fe;
up to 0.001 wt. % Cu;
up to 0.001 wt. % Mo;
up to 0.001 wt. % Nb;
up to 0.001 wt. % P;
up to 0.001 wt. % S; and
no more than 0.0002 wt. % Cl;
with the balance being V and other elements, wherein the vanadium alloy includes not greater than 0.001 wt. % of each of these other elements, and wherein the total of these other elements does not exceed 0.01 wt. %.
65. The wall element of any of clauses 60-64, wherein the steel of the first layer is selected from a tempered martensitic steel, a ferritic steel, an austenitic steel, an oxide-dispersion strengthened steel, T91 steel, T92 steel, HT9 steel, 316 steel, and 304 steel.
66. The wall element of clauses 60-64, wherein the steel of the first layer consists of:
9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;
up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.
67. The wall element of any of clauses 60-66, wherein the steel includes one or more of carbide precipitates of Ti, Zr, V, Nb, Ta or B, nitride precipitates of Ti, Zr, V, Nb, or Ta, and/or carbo-nitride precipitates of Ti, Zr, V, Nb, or Ta and/or wherein the vanadium alloy includes one or more carbide precipitates of Cr, Ti and/or other elements.
68. The wall element of any preceding clause, wherein the first layer has a thickness that is from 1% to 5% of the thickness of the second layer.
69. The wall element of any preceding clause, wherein the wall element is in the form of a tube with an interior surface and an exterior surface, the first layer forming the interior surface of the tube and the second layer forming the exterior surface of the tube.
70. A container for holding a nuclear fuel comprising:
at least one wall element separating a fuel storage region from an external environment;
the wall element having a first layer of steel attached to a second layer of vanadium alloy, wherein the first layer of steel is from 0.1% to 50% of the thickness of the second layer;
the first layer of the wall contacting the external environment and the second layer contacting the fuel storage region.
71. The container of clause 70, wherein the container has a shape that is defined by one or more continuously connected wall elements to form a vessel.
72. The container of clause 70 or 71, wherein the container is shaped as a cylindrical tube, at least one wall element forming a cylindrical wall of the tube and the fuel storage region being the inside of the tube.
73. The container of any of clauses 70-72, wherein the container includes a bottom wall and one or more sidewalls and at least one wall element forms a bottom wall of the container.
74. The container of any of clauses 70-73, wherein the container includes a bottom wall and one or more sidewalls and at least one wall element forms at least one of the one or more sidewalls of the container.

75. An article, comprising:
an amount of nuclear material;
a wall element disposed exterior to the nuclear fuel and separating at least some of the nuclear material from an exterior environment, the wall element consisting of:
a first layer of steel; and
a second layer of vanadium alloy between the first layer and the nuclear material, wherein the first layer of steel is from 0.1% to 50% of the thickness of the second layer and the first layer of steel separates the second layer from the exterior environment.

76. The article of clause 75, wherein the nuclear material includes at least one of U, Th, Am, Np, and Pu.

77. The article of clauses 75 or 76, wherein the first layer includes at least one steel chosen from a martensitic steel, a ferritic steel, an austenitic steel, an oxide-dispersed steel, T91 steel, T92 steel, HT9 steel, 316 steel, and 304 steel.

78. The article of any of clauses 75-77, wherein the nuclear fuel and the wall element are mechanically bonded.

79. The article of any of clauses 75-78, wherein the exterior environment includes molten sodium and the first layer of steel prevents contact between the sodium and the vanadium alloy in the second layer.

80. The article of any of clauses 75-79, wherein the first layer and the second layer are mechanically bonded.

81. The article of any of clauses 75-80, wherein the nuclear material includes at least 90 wt. % of U.

82. The article of any of clauses 75-81, wherein the nuclear material is nuclear fuel and the article is a nuclear fuel element.

83. A power-generating reactor including the article of any of clauses 27-41 and 75-82.

84. A method of manufacturing a wall element for separating a nuclear material from an external environment, the method comprising:
manufacturing a first layer, the first layer including at least a steel layer; and
connecting the first layer to a second layer, the second layer including at least a vanadium alloy layer.

85. The method of clause 84 further comprising:
manufacturing the second layer prior to connecting the second layer to the first layer.

86. The method of clauses 84 or 85, wherein connecting further comprises: connecting the steel layer to the vanadium alloy layer.

87. The method of any of clauses 84-86, wherein manufacturing the first layer includes manufacturing a first layer consisting of the steel layer connected to a chromium layer and connecting includes connecting the first layer to the second layer so that the chromium layer is between the steel layer and the vanadium alloy layer.

88. The method of any of clauses 84-87, wherein the second layer consists of the vanadium alloy layer connected to the chromium layer and connecting includes the first layer to the second layer so that the chromium layer is between the steel layer and the vanadium alloy layer.

Notwithstanding that the numerical ranges and parameters setting forth the broad scope of the technology are approximations, the numerical values set forth in the specific examples are reported as precisely as possible. Any numerical values, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

The invention claimed is:
1. A wall element consisting of:
a first layer of steel;
a second layer containing at least some vanadium;
a third layer between the first layer and the second layer; and
wherein the steel of the first layer consists of:
9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;
up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.

2. The wall element of claim 1, wherein the second layer has a thickness that is from 0.1% to 50% of the thickness of the first layer and the third layer has a thickness that is from 0.1% to 50% of the thickness of the first layer.

3. The wall element of claim 1, wherein the second layer has a thickness that is from 1% to 5% of the thickness of the first layer and the third layer has a thickness that is from 1% to 5% of the thickness of the first layer.

4. The wall element of claim 1, wherein the second layer is selected from the vanadium alloys V-20Ti, V-10Cr-5Ti, V-15Cr-5Ti, V-4Cr-4Ti, V-4Cr-4Ti NIFS Heats 1 & 2, V-4Cr-4Ti US Heats 832665 & 8923864, and V-4Cr-4Ti Heat CEA-J57.

5. The wall element of claim 4, wherein the second layer is V-4Cr-4Ti.

6. The wall element of claim 4, wherein the second layer consists of:
3.0-5.0 wt. % Cr;
3.0-5.0 wt. % Ti; and
no more than 0.02 wt. % C;
with the balance being V and other elements, wherein the vanadium alloy includes not greater than 0.1 wt. % of each of these other elements, and wherein the total of these other elements does not exceed 0.5 wt. %.

7. The wall element of claim 5, wherein the second layer consists of:
3.5-4.5 wt. % Cr;
3.5-4.5 wt. % Ti;
0.04-0.1 wt. % Si;
up to 0.02 wt. % O;
up to 0.02 wt. % N;
up to 0.02 wt. % C;
up to 0.02 wt. % Al;
up to 0.02 wt. % Fe;
up to 0.001 wt. % Cu;
up to 0.001 wt. % Mo;
up to 0.001 wt. % Nb;
up to 0.001 wt. % P;
up to 0.001 wt. % S; and
no more than 0.0002 wt. % Cl;
with the balance being V and other elements, wherein the vanadium alloy includes not greater than 0.001 wt. % of each of these other elements, and wherein the total of these other elements does not exceed 0.01 wt. %.

8. The wall element of claim 1, wherein the second layer consists of:
0.001-0.5 wt. % C;
the balance being V and other elements, wherein the second layer includes not greater than 0.1 wt. % of each of these other elements, and wherein the total of these other elements does not exceed 0.5 wt. %.

9. The wall element of claim 8, wherein the second layer includes from 0.1 to 0.3 wt. % C in addition to V.

10. A container comprising a wall element of claim 1.

11. The wall element of claim 1, wherein the second layer is at least 90% vanadium.

12. The wall element of claim 1, wherein the third layer is of nickel, nickel alloy, chromium, chromium alloy, zirconium, or zirconium alloy.

13. A container for holding a nuclear fuel comprising:
at least one wall element separating a fuel storage volume from an external environment;
the wall element having a first layer of steel separated from a second layer containing at least some vanadium by a third layer between the first layer and the second layer;
the first layer of the wall contacting the external environment and the second layer contacting and the fuel storage volume; and
wherein the steel of the first layer consists of:
9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;
up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.

14. The container of claim 13, wherein the container has a shape that is defined by one or more continuously connected wall elements to form a vessel.

15. The container of claim 13, wherein the container is shaped as a cylindrical tube, at least one wall element forming a cylindrical wall of the tube and the fuel storage volume being the inside of the tube.

16. The container of claim 13 further comprising:
a nuclear material in the container in contact with the second layer.

17. An article, comprising:
an amount of nuclear material;
a wall element disposed exterior to the nuclear material and separating at least some of the nuclear material from an exterior environment, the wall element consisting of:
a first layer of steel in contact with the external environment; and
a second layer containing at least some vanadium in contact with the nuclear material; and
a third layer between the first layer and the second layer, the third layer inhibiting the transfer of carbon from the steel into the second layer
wherein the steel of the first layer consists of:
9.0-12.0 wt. % Cr;
0.001-2.5 wt. % W;
0.001-2.0 wt. % Mo;
0.001-0.5 wt. % Si;
up to 0.5 wt. % Ti;
up to 0.5 wt. % Zr;
up to 0.5 wt. % V;
up to 0.5 wt. % Nb;
up to 0.3 wt. % Ta;
up to 0.1 wt. % N;
up to 0.3 wt. % C;
up to 0.01 wt. % B;
the balance being Fe and other elements, wherein the steel includes not greater than 0.15 wt. % of each of these other elements, and wherein the total of these other elements does not exceed 0.35 wt. %.

18. The article of claim 17, wherein the nuclear material includes at least one of U, Th, Am, Np, and Pu.

19. The article of claim 18, wherein the nuclear material and the wall element are mechanically bonded.

20. The article of claim 19, wherein the exterior environment includes molten sodium and the first layer of steel prevents contact between the sodium and the vanadium in the second layer.

21. The container of claim 13, wherein the second layer is at least 90% vanadium.

22. The container of claim 13, wherein the third layer is of nickel, nickel alloy, chromium, chromium alloy, zirconium, or zirconium alloy.

* * * * *